United States Patent
Abadi et al.

(10) Patent No.: US 9,009,684 B2
(45) Date of Patent: Apr. 14, 2015

(54) METHOD, APPARATUS AND PRODUCT FOR PORTING APPLICATIONS TO EMBEDDED PLATFORMS

(75) Inventors: Aharon Abadi, Eilat (IL); Moria Abadi, Petakh-Tikva (IL); Yishai Feldman, Tel-Aviv (IL); Maayan Goldstein, Holon (IL)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 13/449,316

(22) Filed: Apr. 18, 2012

(65) Prior Publication Data

US 2013/0283248 A1    Oct. 24, 2013

(51) Int. Cl.
*G06F 9/44* (2006.01)
*G06F 9/45* (2006.01)

(52) U.S. Cl.
CPC .. *G06F 8/76* (2013.01); *G06F 8/40* (2013.01); *G06F 8/443* (2013.01)

(58) Field of Classification Search
USPC .......................................... 717/136, 152, 153
See application file for complete search history.

(56) References Cited

U.S. PATENT DOCUMENTS

| | | | | |
|---|---|---|---|---|
| 5,694,564 | A * | 12/1997 | Alsup et al. .................... | 712/216 |
| 6,442,663 | B1 | 8/2002 | Sun et al. | |
| 6,453,403 | B1 | 9/2002 | Czajkowski | |
| 6,625,746 | B1 * | 9/2003 | Moore ............................ | 714/6.1 |
| 7,367,024 | B2 | 4/2008 | Barua et al. | |
| 2003/0123472 | A1 * | 7/2003 | Dufour et al. .................. | 370/442 |
| 2003/0163661 | A1 * | 8/2003 | Marion et al. ................. | 711/170 |
| 2003/0177472 | A1 * | 9/2003 | de Jong ......................... | 717/110 |
| 2004/0153617 | A1 * | 8/2004 | Motta ............................. | 711/170 |
| 2005/0055406 | A1 * | 3/2005 | Singhai et al. ................ | 709/206 |
| 2006/0036798 | A1 * | 2/2006 | Dickey et al. .................. | 711/100 |
| 2006/0080372 | A1 * | 4/2006 | Barua et al. .................... | 707/206 |
| 2006/0236065 | A1 * | 10/2006 | Lee ................................. | 711/171 |
| 2007/0294499 | A1 * | 12/2007 | Garthwaite .................... | 711/170 |
| 2008/0126736 | A1 * | 5/2008 | Heil ................................ | 711/171 |
| 2008/0148002 | A1 * | 6/2008 | Fleming ......................... | 711/170 |
| 2008/0222224 | A1 * | 9/2008 | Rangarajan et al. .......... | 707/206 |
| 2008/0301646 | A1 * | 12/2008 | Gupta ............................ | 717/127 |
| 2009/0113162 | A1 * | 4/2009 | Di-Zenzo ...................... | 711/171 |
| 2010/0205374 | A1 * | 8/2010 | Meka et al. .................... | 711/117 |
| 2012/0179895 | A1 * | 7/2012 | Venkataramanan et al. .. | 712/200 |

FOREIGN PATENT DOCUMENTS

WO          03056474          7/2003

OTHER PUBLICATIONS

Mattos et al. "Making Object Oriented Efficient for Embedded System Applications", ACM 2005, pp. 104-109.*

(Continued)

*Primary Examiner* — Li B Zhen
*Assistant Examiner* — Viva Miller
(74) *Attorney, Agent, or Firm* — Ziu Glazberg (57) ABSTRACT

A computer-implemented method and apparatus for transforming code to embedded environments, the method comprising: receiving program code not complying with a limitation of an embedded computing environment; transforming at least part of the program code to modified program code in order for the modified program code to be in compliance with the limitation; and storing the modified program code on a storage device. wherein the modified program code complies with the limitation of the embedded computing environment.

18 Claims, 3 Drawing Sheets

(56) References Cited

OTHER PUBLICATIONS

Wegman et al. "Constant Propagation with Conditional Branches" ACM 1991, pp. 181-210.*

Abadi et al. "Improving Slice Accuracy by Compression of Data and Control Flow Paths" ACM 2009, pp. 223-232.*

Cousot et al. "Static determination of dynamic properties of programs", ISOP, 1978.*

Cousnot et al. "Automatic discovery of linear restraints among variables of a program", pp. 84-97, POPL '78.*

Bruce Powel Douglass, "Real-Time Design Patterns: Robust Scalable Architecture for Real-Time Systems", Addison Wesley Professional, Sep. 2002.

Visual WebGui, "Application Delivery Solutions", NET Application Delivery, Virtualiztion, Development & Migration, Dec. 2011.

Blanchet et al., "A Static Analyzer for Large Safety-Critical Software", In: Proc. ACM SIGPLAN'2003 Conf, PLDI, San Diego, ACM Press, pp. 196-207, 2003.

Mattos and Carro, "Object and method exploration for embedded systems applications", ACM, p. 321, Sep. 3-6, 2007.

Atienza et al., "Systematic dynamic memory management design methodology for reduced memory Footprint", ACM, vol. 11 Issue 2, Apr. 2006.

Zhao et al., "Dynamic memory optimization using pool allocation and prefetching", ACM SIGARCH Computer Architecture News—Special issue on the 2005 workshop on binary instrumentation and application, vol. 33 Issue 5, Dec. 2005.

Lattner and Adve, "Automatic pool allocation: compile-time control of data structure layout in the heap", University of Illinois at Urbana-Champaign, 2004.

Bjarne Steensgaard, "Points-to Analysis in Almost Linear Time", POPL '96 Proceedings of the 23rd ACM SIGPLAN-SIGACT symposium on Principles of programming languages, 1996.

Lars Ole Andersen, "Program Analysis and Specialization for the C Programming Language", DIKU, University of Copenhagen, 1994.

\* cited by examiner

METHOD, APPARATUS AND PRODUCT FOR PORTING APPLICATIONS TO EMBEDDED PLATFORMS

TECHNICAL FIELD

The present disclosure relates to embedded software in general, and to porting application code into embedded environments, in particular.

BACKGROUND

In recent decades, electronic technology, and in particular mobile devices, has revolutionized our everyday lives. Devices such as cell phones, PDAs, mobile media players and digital cameras have permeated the lives of almost every person living in the developed world—and a significant number of people living in undeveloped countries. Mobile communication and computing devices, especially, have become the means by which countless millions conduct their personal and professional interactions with the world. It has become almost impossible for many people, especially those in the business world, who use these devices as a means to improve productivity, to function without access to their electronic devices.

Due to this proliferation, there is a constantly increasing demand for applications for such devices, and in particular for applications that already exist for more conventional computing platforms, such as desktop computers, laptop computers, servers and others.

However, such devices are different in a number of aspects from the more conventional computing platforms, which makes porting of existing programs into embedded programs a non-trivial task.

The aspects include memory management, user interface and additional aspects, since resources such as memory, screen real estate and other resources of mobile devices are naturally limited in mobile devices relatively to those of conventional devices.

Specifically for memory management, dynamic memory allocation which is common in programming is impractical in embedded software for at least two reasons. First, allocation and deallocation are non-deterministic in time, because allocation may require searching for a large enough memory block. In addition deallocation may sometime be implicit, in which case it may be done by a garbage collector which may also be non-deterministic in time.

Second, dynamic memory allocation is highly associated with fragmentation, which may pose a serious problem, especially when memory resources are limited, and the devices may go along time between reboots.

BRIEF SUMMARY

One exemplary embodiment of the disclosed subject matter is a computer-implemented method performed by a computerized device, comprising: receiving program code not complying with a limitation of an embedded computing environment; transforming at least part of the program code to modified program code in order for the modified program code to be in compliance with the limitation; and storing the modified program code on a storage device, wherein the modified program code complies with the limitation of the embedded computing environment.

Another exemplary embodiment of the disclosed subject matter is an apparatus having a processing unit and a storage device, the apparatus comprising a receiving component for receiving program code not complying with a limitation of an embedded computing environment; a transformation component for transforming the program code into modified program code in order for the modified program code to be in compliance with the limitation; and a storage device for storing the modified program code, wherein the modified program code complies with the limitation of the embedded computing environment.

Yet another exemplary embodiment of the disclosed subject matter is a computer program product comprising: a non-transitory computer readable medium; a first program instruction for receiving program code not complying with a limitation of an embedded computing environment; a second program instruction for transforming at least part of the program code to modified program code in order for the modified program code to be in compliance with the limitation; and a third program instruction for storing the modified program code on a storage device, wherein the modified program code complies with the limitation of the embedded computing environment, and wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the difficulties in automatic porting of applications to embedded devices, such as mobile devices. The code has to be modified to adhere with limitations posed by the mobile devices which are not encountered when programming for the original platform on which the application is traditionally executed.

Another technical problem is that mobile devices are generally unable to execute, or cannot reliably execute code that includes dynamic allocation and deallocation of memory, since allocation and deallocation may be non-deterministic in time. Even further, deallocation may be implicit and may be done by a garbage collector, in which case it is unknown when the memory will be freed. Other reasons for avoiding dynamic memory allocation may be known to a person of skill in the art.

This problem also relates to the fragmentation that may be caused by dynamic allocation and deallocation of memory in mobile devices. Since mobile devices can go a long time between reboots, fragmentation can cause severe shortage of memory resources.

One technical solution comprises a method, apparatus and product for porting computer code into modified computer code, which can be compiled if necessary, and executed by a device which does not support dynamic memory allocation and deallocation, such as a mobile device.

In some embodiments, for each object type referenced within the program code, it is attempted to determine, for example using static analysis, the maximal number of objects of that type which may exist concurrently during execution of the program. When the size of the object is unknown, which can happen for example if the object is allocated dynamically and its size is predetermined in runtime, static analysis may be performed in order to determine the size. If static analysis fails, then dynamic analysis can be used. In further embodiments, the user can be asked to provide the object size.

Optionally, the maximal number may be determined not over the entire program but rather over a part of the computer code, i.e., one or more subprograms of the computer code which are comparable to the original code with regard to the particular object type, e.g., the same maximal number of objects of the object type are created in the original code and in the subprogram. This analysis may be performed using static analysis techniques such as slicing.

If the determination is successful, i.e., a maximal bound is determined, then the code may be modified by adding instructions for allocating a static object pool, having a size which is at least the determined maximal number of objects, multiplied by the size of the respective object, the object pool thus being capable of retaining at least the maximal number of objects.

Object allocation instructions in the original code, such as "new" commands, may be replaced with instructions for allocating a slot for the object from the object pool. Since the object pool is created such that it can accommodate the maximal number of co-existing objects, the required memory is available.

It is further determined when an allocated object is no longer required, using for example static analysis. The analysis may search for deallocation commands, either explicit such as "delete", or implicit when the object is no longer required, for example when the program leaves the scope in which it is defined, are replaced by indicating the slot in the object pools as free, so it can be re-allocated.

If the static analysis fails, dynamic analysis may be performed. In further embodiments, the user may be asked to indicate the deallocation point of the object.

If the determination is unsuccessful for one or more object types, i.e., a maximal number cannot be determined for all objects, then the code may be modified by adding instructions for allocating a static buffer of fixed size for each object type. Each buffer is sized to accommodate a fixed number of fixed-size blocks. The buffers may be implemented as heaps, stacks, or any other data structure.

Each of the buffers may be able to accommodate the same number of objects, or different number of objects. For example, if it is known that for each object of type A, two objects of type B are created, then the buffer for type B may be able to accommodate twice as many type B objects than the number of type A objects contained in type A buffer. It will be appreciated that any ratio between maximal number of objects in each buffer may be achieved. In some exemplary embodiments, the ratio may be determined based on statistic analysis. Alternatively or additionally, the ratio may be determined based on dynamic analysis such as dynamic profiling, or based on indications provided by the user.

In some exemplary embodiments, when static analysis fails object allocation instructions in the original code, such as "new" commands, may be replaced with instructions to allocate the object from the set having the smallest block size that can accommodate the object. Thus, if all blocks in the set allocated for the particular object type are allocated, and it is required to allocate another object of that type, available blocks of sets associated with increasingly larger sizes are searched for, until an available space is located.

Deallocation commands, either explicit such as "free" or implicit when the object is no longer required, are replaced by indicating the memory space associated with the object as free. Determining the relevant memory space can be done in a constant time using its address, and hence the set it is associated with can be indicated as free and reused when required.

One technical effect of the disclosed subject matter is the automatic modification of computer code which comprises dynamic allocation and deallocation commands into computer code that uses static allocation and deallocation. This modification enables the porting of computer code to devices which do not support dynamic memory management, and in particular mobile devices.

Another technical effect of the disclosed subject matter is that the memory is managed in space-efficient manner although it is static and not dynamic. When the number of objects of a particular type allocated is known or can be bound, this will also bound the statically allocated memory. When such bound cannot be determined, the memory may be managed economically to keep the amount of allocated memory low.

Yet another technical effect of the disclosed subject matter is that the memory may be managed in time-efficient manner, since each allocation and deallocation may take a constant amount of time, thus keeping the applications scalable.

Figure 1:
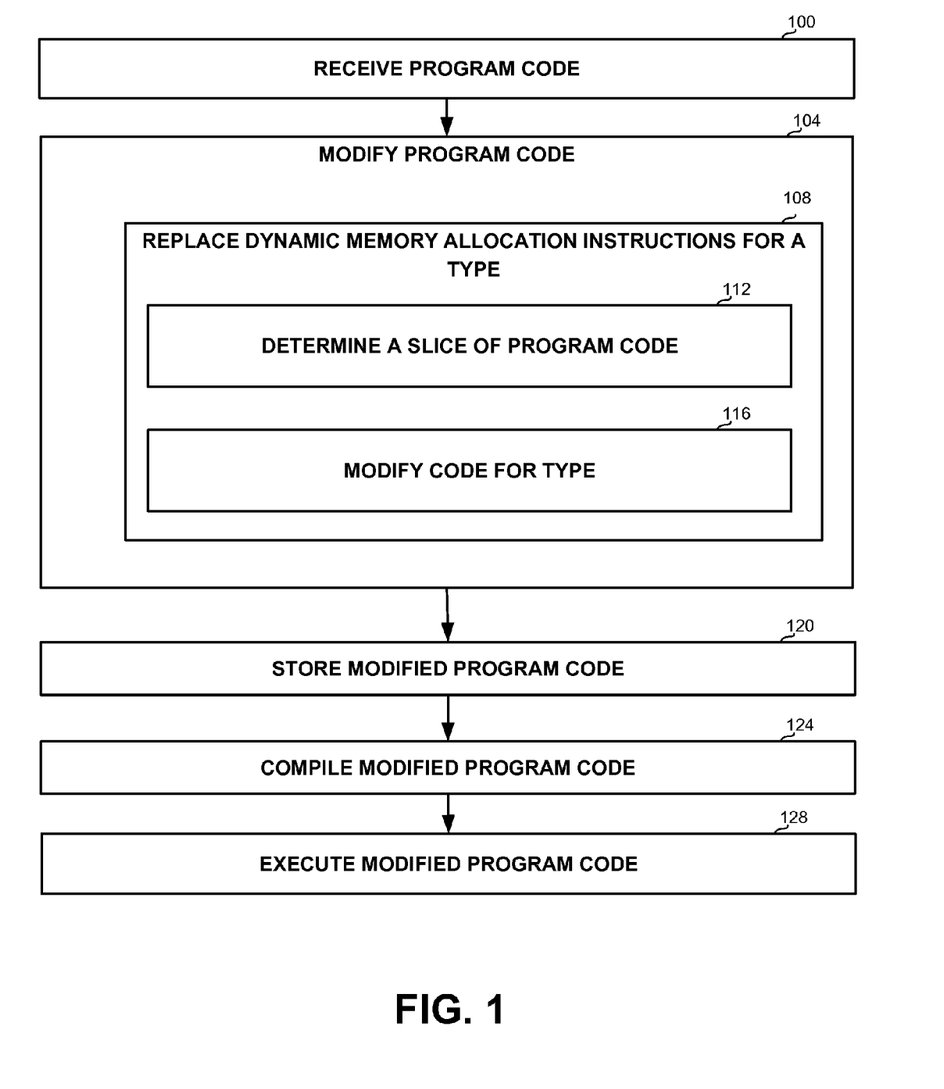
FIG. 1 shows a flowchart of steps in a method for porting applications to embedded environments, in accordance with some exemplary embodiments of the disclosed subject matter.

Referring now to FIG. 1 showing a flowchart of steps in a method for porting applications into embedded environments.

On step 100, program code is received, which may comprise instructions for dynamic allocation or deallocation of objects of one or more types or data structures. The program code may be written in any programming language, including for assembly, high level programming languages such as C, C++, C#, Java, any object oriented language, procedural language, or any other programming language.

On step 104, the program code may be modified so as to comply with limitations imposed by a target device, which may execute the program code. In some embodiments, the target device may be a device that does not enable dynamic memory allocation and deallocation, such as a mobile device.

In some embodiments, modification step 104 may comprise step 108 for replacing dynamic memory allocation and deallocation instructions for one or more object types or data structures.

In some embodiments, step 108 may comprise determining a slice of the program code on step 112, for determining one or more subparts of the program code in which the same number of objects of the particular type are created and destroyed as in the original program code, i.e., the program code and the determined slice are comparable regarding the particular data type. Determining the slice can be performed, for example, as described in "Improving slice accuracy by compression of data and control flow paths" by Abadi, Ettinger and Feldman, published in ESEC/SIGSOFT FSEACM (2009), p. 223-232, and presented on Aug. 24-28 2009, incorporated herein by reference, in its entirety.

Slicing step 112 may utilize a substep which indicates all instructions in the source that relate to allocating or deallocating an object of the particular type, after which one or more subprograms are determined which include all said instructions and optionally other relevant instructions.

In some programs, implicit deallocation may be performed without explicit invocation of a deallocation instruction. Such deallocations may be identified using Escape Analysis techniques, such as described by Blanchet, and Bruno in "Escape analysis for Java: Theory and practice" published in ACM Transactions on Programming Languages and Systems, 25(6):713-775, November 2003, incorporated herein by reference, in its entirety, or by using any other method known in the art.

On step 116, the program code or slice, if such slice was determined on step 112, is modified in relation to the particular type. Modification step 116 is further detailed in association with FIG. 2 below. The modified code is compliant with limitations of the embedded computing platform.

On storing step 120, the modified code may be stored on a storage device. The storage device may be persistent such as a disk, or volatile such as random access memory (RAM).

On compilation step 124, the modified code may be compiled, if required. Compilation may be omitted if the modified code is implemented in an interpreted language which does not require compilation.

On execution step 128, the modified or compiled code may be executed by the target device, such as a mobile device or another embedded device.

Figure 2:
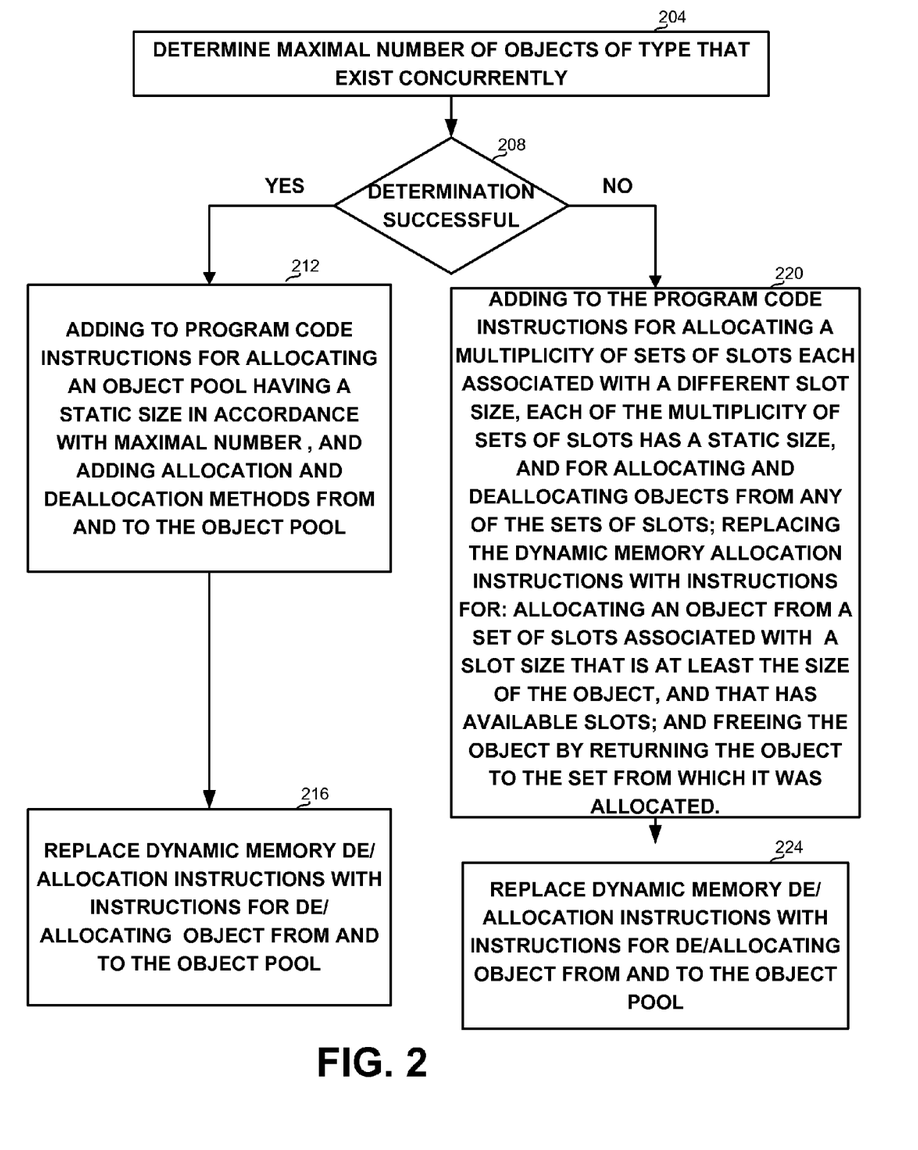
FIG. 2 shows a flowchart of steps in a method for code modification with regard to a type of a particular size, in accordance with some exemplary embodiments of the disclosed subject matter.

Referring now to FIG. 2, showing a flowchart of steps in an embodiment for code modification with regard to a particular type, as disclosed in association with step 116 above. In some exemplary embodiments, the steps of FIG. 2 can be performed for each type, or for some of the used types.

On step 204, it may be attempted to determine a maximal number of instances having a particular size which may exist concurrently. For example, for the following series of creations and destructions: new-new-delete-new-delete, a maximum of two objects exist concurrently.

The determination may be done statically, without executing the code, such as using static analysis. The determination may be performed by computing supersets of the possible values of every variable in the program at every program point, using for example value range analysis, such as the technique described in "A Static Analyzer for Large Safety-Critical Software" by Bruno Blanchet, Patrick Cousot, Radhia Cousot, Jerome Feret, Laurent Mauborgne, Antoine Mine, David Monniaux and Xavier Rival, presented in PLDI '03, Jun. 9-11, 2003, San Diego, Calif., USA, incorporated herein by reference in its entirety. In other exemplary embodiments, the maximal number of instances of the particular type can be performed using constant propagation, as described for example in Wegman and Zadeck in "Constant propagation with conditional branches" published in ACM Transactions on Programming Languages and Systems (TOPLAS) Volume 13 Issue 2, April 1991, incorporated herein by reference, in its entirety. In yet other exemplary embodiments, the maximal number of instances of the particular type can be performed using interval analysis, as described for example by P. Cousot and R. Cousot in "Static determination of dynamic properties of programs" published in Proceedings of the $2^{nd}$ International Symposium on Programming ISOP'76 on April 1976, or in P. Cousot and N. Halbwachs "Automatic discovery of linear restraints among variables of a program," published in Conference Record of the Fifth Annual ACM SIGPLAN-SIGACT Symposium on Principles of Programming Languages, pages 84-97, POPL'78 on 1978, both references incorporated herein by reference in their entirety. It will be appreciated that any other static analysis can also be used, and that the disclosure is not limited to value range, interval range, or constant propagation.

If the possible values cannot be determined statically, then dynamic analysis may be employed by executing the computer code on the conventional device for determining or approximating the number of objects. In some exemplary embodiments, dynamic analysis may be used for determining the ratio of number of objects of different types, for example by executing the program on large representative inputs, profiling the execution and determining the maximal number of objects. In other embodiments, input provided by the user may be used for determining the ratio.

Using the possible values, it is attempted to bound the number of times each loop within the program or the slice that contains allocation or deallocation commands is performed, thus bounding the number of objects that may exist concurrently.

On step 208, it may be determined whether a maximal number has indeed been identified for the particular object type.

If such number has been identified, then on step 212, instructions are added to the program, which allocate an object pool for the object type. The size of the object pool is at least the maximal number of objects as determined successfully on step 204, multiplied by the size of the object type. The object pool may be implemented as an array in which each entry is an object of the particular type. In alternative embodiments, other data structures such as a linked list, heap or the like may be used.

Also provided are methods or functions for allocating and deallocating an object from the object pool. For example, if the object pool is implemented as an array, allocation may be implemented by providing the address of the first available object, and indicating its entry number as occupied, and deallocation may be implemented as indicating the entry as free.

On step 216, the dynamic allocation and deallocation instructions from the program code may be replaced by calls to the allocation and deallocation methods or functions created on step 212. If no explicit deallocation instruction exists for a particular object, the deallocation method may be called at the location indicated by the escape analysis discussed in association with step 112 above, at which point at the latest the object is no longer accessible.

If, however, it is determined on step 208 that a maximal number could not be determined on step 204, then a different approach may be taken.

On step 220, instructions may be added to the program, which allocate a set of slots for objects of each type for which dynamic allocation and deallocation instructions exist, in accordance with the available memory. Each such set may be implemented as a heap, a linked list, a stack or any other data structure. A set is provided for each such type or for types having the same or similar size. The available memory may be split so that all sets contain the same number of objects of their respective type, all sets are of the same size, or using any heuristics or knowledge, relating for example to the relative number of objects instantiated of each type.

Also provided are methods or functions for allocating and deallocating an object from the heap. Allocation of an object may be implemented such that first it is determined whether space having the size of the object may be allocated from the set associated with the object type. If such space exists, its address is provided and it is indicated as allocated. Otherwise, sets associated with increasingly larger objects are examined, and the space for the object is allocated from the first set having a large enough free space, so that the space allocated for the object is the smallest one available.

Deallocating the object may be implemented by identifying the set it was allocated from using the object address, and indicating it as free.

On step 224, the dynamic allocation and deallocation instructions from the program code are replaced by calls to the allocation and deallocation methods or functions created on step 220. If no explicit deallocation instruction exists for an object, the deallocation method may be called at the point identified by the escape analysis as the point at which the object may cease to exist.

It will be appreciated that if the size of the object type cannot be determined statically, due for example to the usage of third party code, then a profiler can be used while executing the original program code, for estimating the objects size. Alternatively, the size of the object type may be obtained from the user.

Figure 3:
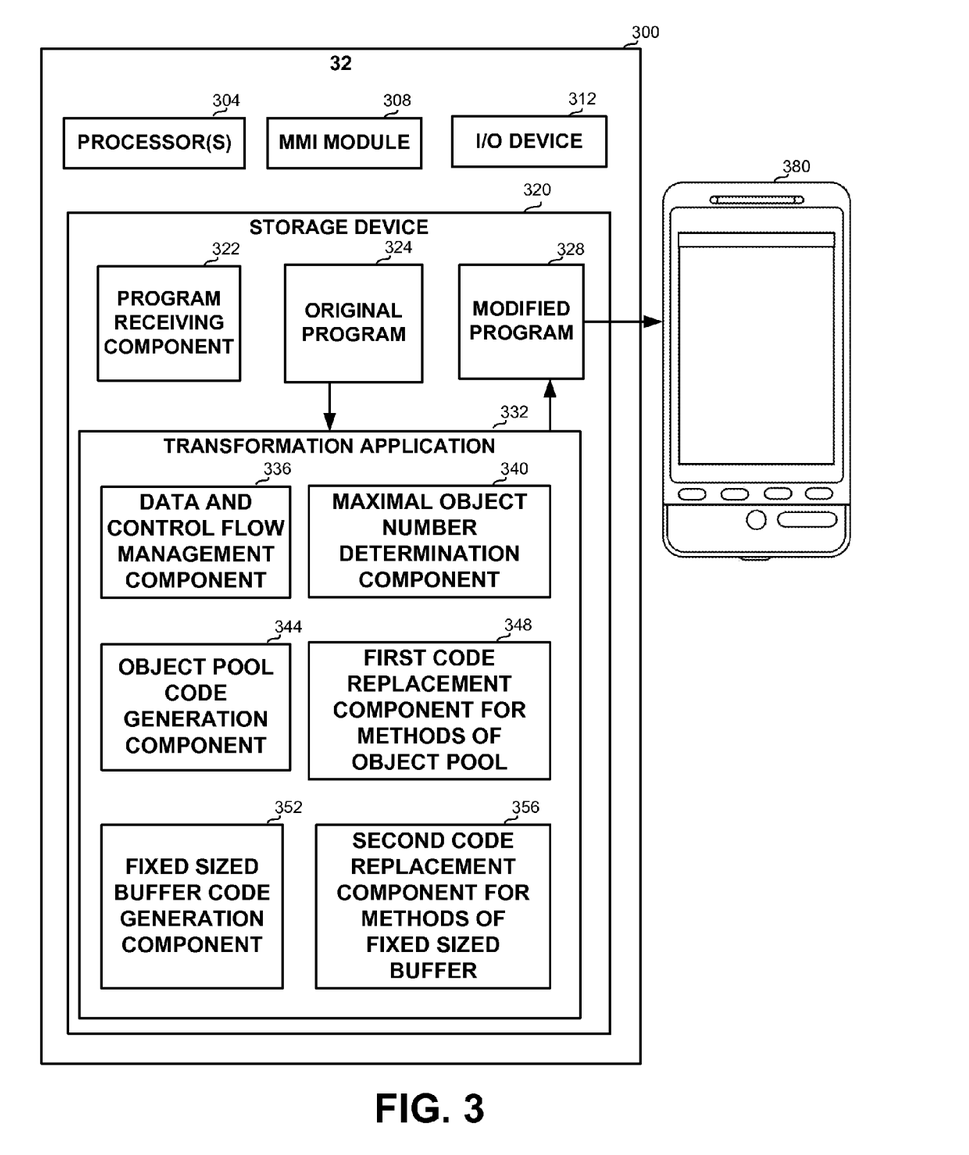
FIG. 3 shows a block diagram of an apparatus for porting applications to embedded environments, in accordance with some exemplary embodiments of the disclosed subject matter.

Referring now to FIG. 3 showing a block diagram of an apparatus for porting applications to embedded environments The environment comprises a computing device 300, which may comprise one or more processors 304. Any of processors 304 may be a Central Processing Unit (CPU), a microprocessor, an electronic circuit, an Integrated Circuit (IC) or the like. Alternatively, computing device 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by computing device 300 or any of it subcomponents.

In some exemplary embodiments of the disclosed subject matter, computing device 300 may comprise a man machine interface (MMI) module 308. MMI module 308 may be utilized to receive input or provide output to and from the apparatus, for example receiving the original program code, storing and retrieving modified program code to and from a storage device, providing output, or the like.

In some embodiments, computing device 300 may comprise an input-output (I/O) device 312 such as a terminal, a display, a keyboard, an input device or the like to interact with the system, to invoke the system and to receive results. It will however be appreciated that the system can operate without human operation and without I/O device 312.

Computing device 300 may comprise one or more storage devices 320 for storing executable components, and which may also contain data during execution of one or more components. Storage device 320 may be persistent or volatile. For example, storage device 320 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 320 may retain program code operative to cause any of processors 304 to perform acts associated with any of the steps shown in FIG. 1 or FIG. 2 above, for example determining a slice of the program code, modifying the code, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

Storage device 320 may comprise program receiving component 322 for receiving a computer program to be transformed for another platform. The computer program may be received via a communication means such as the Internet, through a communication line, from another storage device, or the like.

Storage device 320 may store original program 324 as received by program receiving component 322, and may store modified program 328 as created from original program 324 by transformation application 332, and is adapted to be loaded to and used by a different platform, such as mobile device 380. It will be appreciated that multiple modified programs may be created based upon original program 324, in order to adapt original program 324 to multiple platforms.

Storage device 320 may comprise transformation application 332 for transforming computer code into modified computer code, wherein the modified code complies with limitations of another computing platform, such as a mobile device, or another embedded device.

Transformation application 332 may comprise data and control flow management component 336, for managing the control and data flow between components of transformation application 332, and between transformation application 332 and other components of computing device 300 or other computing devices.

Transformation application 332 may comprise maximal object number determination component 340, for determining the maximal number of objects of a particular type that may exist concurrently.

Transformation application 332 may comprise components for generating allocation code and methods, and for replacing dynamic memory allocation and deallocation commands with static ones.

Transformation application 332 may thus comprise object pool code generation component 344 for generating code for allocating the object pool and implementing the allocation and deallocation methods thereof, and first code replacement component 348 for calling the allocation and deallocation methods of the object pool instead of dynamic memory allocation and deallocation commands. Object pool code generation component 344 and first code replacement component 348 may be activated if maximal object number determination component 340 determines a maximal number for a particular type.

Transformation application 332 may also comprise fixed size buffer code generation component 352 for generating code for allocating a fixed size buffer and implementing the allocation and deallocation methods thereof, and second code replacement component 356 for calling the allocation and deallocation methods of the fixed size buffer instead of dynamic memory allocation and deallocation commands. Fixed size buffer code generation component 352 and second code replacement component 356 may be activated if maximal object number determination component 340 cannot determine a maximal number.

It will be appreciated that the method and apparatus are not limited to object oriented environments in which objects are allocated and deallocated, but also to procedural programming environments, in which dynamic allocation instructions such as "malloc" and "free" (or equivalent commands in languages other than C) are used rather than "new" and "delete" instructions.

The disclosed method and apparatus enable automatic porting of program code by transforming dynamic memory management, into static memory management, thus enabling the usage of applications for mobile devices.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
   receiving program code not complying with a limitation of an embedded computing environment;
   transforming at least part of the program code to modified program code in order for the modified program code to be in compliance with the limitation; and
   storing the modified program code on a storage device, wherein the modified program code complies with the limitation of the embedded computing environment; and
   wherein transforming the program code comprises replacing dynamic memory allocation instructions for objects having a predetermined size with static memory allocation instructions, and wherein replacing the dynamic memory allocation instructions further comprises
      determining a maximal number of objects having a predetermined size that exist concurrently when at least a part of the program code is executed;
      adding to the program code instructions for allocating an object pool having a static size for retaining at least the maximal number of objects of the predetermined size, and for allocating and deallocating objects from the object pool; and
      replacing the dynamic memory allocation instructions with instructions for:
         allocating an object of the predetermined size from the object pool; and
         freeing the object of the predetermined size by returning the object to the object pool;
      and wherein said replacing the dynamic memory allocation instructions for a second type comprises:
         adding to the program code instructions for allocating a multiplicity of sets of slots each associated with a different slot size, wherein each of the multiplicity of sets of slots has a static size, and for allocating and deallocating objects from any of the sets of slots; and
         replacing the dynamic memory allocation instructions with instructions for:
            allocating an object having an object size from a set of slots associated with a slot size that is at least the object size, and that has available slots; and
            freeing the object by returning the object to the set from which it was allocated.

2. The computer-implemented method of claim 1, wherein the embedded computing environment is a mobile computing device.

3. The computer-implemented method of claim 1, wherein said replacing the dynamic memory allocation instructions comprises:
   determining a maximal number of the objects of the predetermined size that exist concurrently when at least a part of the program code is executed;
   adding to the program code instructions for allocating an object pool having a static size for retaining at least the maximal number of objects of the predetermined size, and for allocating and deallocating objects from the object pool; and
   replacing the dynamic memory allocation instructions with instructions for:
      allocating an object of the predetermined size from the object pool; and freeing the object of the predetermined size by returning the object to the object pool.

4. The computer-implemented method of claim 1, wherein said replacing the dynamic memory allocation instructions comprises:
   adding to the program code instructions for allocating a multiplicity of sets of slots each associated with a different slot size, wherein each of the multiplicity of sets of slots has a static size, and for allocating and deallocating objects from any of the sets of slots; and
   replacing the dynamic memory allocation instructions with instructions for:
      allocating an object from a set of slots associated with a slot size that is at least the size of the object, and that has available slots; and
      freeing the object by returning the object to the set from which it was allocated.

5. The computer-implemented method of claim 4, wherein said replacing comprises trying to determine bounds on a maximal number of objects of each of the multiplicity of different sizes; and in response to failing to determine at least one of the bounds, performing said adding and replacing with instructions for the allocation and the freeing.

6. The computer-implemented method of claim 5 wherein the each of the bounds is determined using static analysis, dynamic analysis or obtaining the bound from a user.

7. The computer-implemented method of claim 3, further comprising determining a slice of the program code as the at least part of the program code, wherein the at least part of the program code is equivalent to the program code with respect to the object.

8. The computer-implemented method of claim 3, wherein said determining a maximal number of objects having a predetermined size uses an algorithm selected from the group consisting of: escape analysis, value range analysis, interval analysis, polyhedron analysis, and constant propagation.

9. The computer-implemented method of claim 3, wherein said determining a maximal number of objects comprises:
   determining areas of the program code in which variables are allocated and freed; and
   determining a number of times the areas of the program code are executed.

10. The computer-implemented method of claim 3, wherein the storage device is a storage device of an embedded device.

11. An apparatus comprising:
   a hardware processing unit;
   a receiving component for receiving program code not complying with a limitation of an embedded computing environment;
   a transformation component for transforming the program code into modified program code in order for the modified program code to be in compliance with the limitation; and
   a hardware storage device for storing the modified program code,
   wherein the modified program code complies with the limitation of the embedded computing environment;
   wherein the transformation component is adapted to replace dynamic memory allocation instructions for objects having a predetermined size, and wherein the transformation component further comprises
  a maximal object number determination component for determining whether there exists a maximal number of objects having a predetermined size that exist concurrently when at least a part of the program code is executed;
  a pool allocation code generation component for generating code instructions for allocating an object pool having a static size of at least the maximal number of objects times the predetermined size;
  a first code replacement component for replacing allocation-relate instructions for the objects with instructions for:
allocating an object having the predetermined size from the object pool; and
freeing the object having the predetermined size by returning the object to the object pool;
  a fixed sized buffer allocation code generation component for generating code instructions for allocating multiplicity of sets of slots each associated with a different slot size, and wherein the sets of slots have static sizes; and
  a second code replacement component for replacing allocation-relate instructions for objects having an object size with instructions for:
allocating an object from a set of slots associated with a slot size that is at least the object size, and that has available slots; and
freeing the object by returning the object to the set of slots from which it was allocated.

12. The apparatus of claim 11, wherein the embedded computing environment is a mobile computing device.

13. The apparatus of claim 11, wherein the transformation component comprises:
  a maximal object number determination component for determining a maximal number of objects having the predetermined size that exist concurrently when at least a part of the program code is executed;
  a pool allocation code generation component for generating code instructions for allocating an object pool having a size of at least the maximal number of objects times the predetermined size; and
  a first code replacement component for replacing allocation-relate instructions for objects of the size with instructions for:
allocating an object of the predetermined size from the object pool; and
freeing the object of the predetermined size by returning the object to the object pool.

14. The apparatus of claim 11, wherein the transformation component comprises:
  a fixed sized buffer allocation code generation component for generating code instructions for allocating a multiplicity of sets of slots each associated with a different slot size, wherein each of the multiplicity of sets of slots has a static size; and
  a second code replacement component for replacing allocation-relate instructions for objects of any of the set with instructions for:
allocating an object from a set of slots associated with a slot size that is at least the size of the object, and that has available slots; and
freeing the object by returning the object to the set from which it was allocated.

15. The apparatus of claim 14 wherein said fixed sized buffer allocation code generation component determines a bound on a maximal number of objects of each of the multiplicity of different sizes using a static analysis component, a dynamic analysis component or a component for obtaining the bound from a user.

16. The apparatus of claim 13, further comprising a slice determination component for determining a slice of the program code which is equivalent to the program code regarding the objects.

17. The apparatus of claim 13, wherein the maximal object number determination component uses an algorithm selected from the group consisting of: escape analysis, value range analysis, polyhedron analysis, interval analysis, and constant propagation.

18. A computer program product comprising:
  a non-transitory computer readable medium;
  a first program instruction for receiving program code not complying with a limitation of an embedded computing environment,
  a second program instruction for transforming at least part of the program code to modified program code in order for the modified program code to be in compliance with the limitation; and
  a third program instruction for storing the modified program code on a storage device,
wherein the modified program code complies with the limitation of the embedded computing environment, and
wherein said first, second and third program instructions are stored on said non-transitory computer readable medium wherein transforming the program code comprises replacing dynamic memory allocation instructions for objects having a predetermined size with static memory allocation instructions, and wherein replacing the dynamic memory allocation instructions further comprises
  determining a maximal number of objects having a predetermined size that exist concurrently when at least a part of the program code is executed;
  adding to the program code instructions for allocating an object pool having a static size for retaining at least the maximal number of objects of the predetermined size, and for allocating and deallocating objects from the object pool; and
  replacing the dynamic memory allocation instructions with instructions for:
  allocating an object of the predetermined size from the object pool; and
freeing the object of the predetermined size by returning the object to the object pool;
  and wherein said replacing the dynamic memory allocation instructions for a second type comprises:
  adding to the program code instructions for allocating a multiplicity of sets of slots each associated with a different slot size, wherein each of the multiplicity of sets of slots has a static size, and for allocating and deallocating objects from any of the sets of slots; and
  replacing the dynamic memory allocation instructions with instructions for:
  allocating an object having an object size from a set of slots associated with a slot size that is at least the object size, and that has available slots; and
freeing the object by returning the object to the set from which it was allocated.

* * * * *